May 23, 1944.   C. E. KEEFER   2,349,626
COMPASS
Filed Nov. 6, 1942   2 Sheets-Sheet 1

Inventor
CLARENCE E. KEEFER.
By Howard J. Whelan.
Attorney

May 23, 1944.  C. E. KEEFER  2,349,626
COMPASS
Filed Nov. 6, 1942  2 Sheets-Sheet 2

Inventor
CLARENCE E. KEEFER.
By Howard J. Whelan.
Attorney

Patented May 23, 1944

2,349,626

UNITED STATES PATENT OFFICE 2,349,626

COMPASS

Clarence E. Keefer, Baltimore, Md.

Application November 6, 1942, Serial No. 464,722

2 Claims. (Cl. 33—223)

This invention refers to marine instruments and more particularly to magnetic compasses used for navigating marine vessels, and land and air vehicles. It has among its objects to provide a magnetic compass that will be highly leak-proof. Also to have a structure that will enable the compass to be readily taken apart for inspection or repair without dismantling the main body of the device or disturbing the position of its pivot support, pivot or indicating card. Another object is to make ample provision for taking up expansion and contraction within the instrument and its contents, but particularly in regard to its liquid medium. A further object is to make the pivot and card independent of the expansion structure so that the removal and handling of the latter can be made freely without loosening up the instrument in general. A still further object is to provide arrangements in the design and structure of the device that will reduce the possibilities of leakage of the liquid medium from it, to a minimum. Also to have a compression chamber external to the main casing of the compass where the expansion and contraction of the liquid medium in the instrument may be taken up conveniently and without incidental inconvenience to manipulation when its removal or replacement may be desirable.

Other objects will become apparent as the invention is more fully set forth.

The art of the magnetic compass is relatively old and highly developed, but none the less important. The repair of the instruments from marine vessels is a matter of frequent occurrence and requires the services of experts found in land establishments. A frequent cause of trouble is experienced in the case holding the compass proper and its liquid medium. The liquid being of alcohol and water mixed, is thin enough to leak through a relatively small crack. It is very hard to overcome and usually requires the opening up of the whole instrument, undoing its screws and bolts, lifting off plates and otherwise separating it into parts. The assembling of the instrument after repairs have been made is the cause of further trouble at a later date, as the materials are old, worn and have not the close fitting qualities incident to their original manufactured condition. In this invention, the casing does not have to be taken to pieces to make minor repairs. It is left as it is, and the joints at cover glass and bottom glass, rings and sealings are not disturbed. If they are tight then, they are left as they are and will usually remain so. However the matter of attending to the expansible element is readily taken care of by its being made as a unit readily removed and replaced. The magnetic card section and compass case do not have to be disturbed at all, as they are not included in the unit or affected by the removal and replacement of the cup unit. The liquid medium may be readily removed and replaced without disturbing the rest of the parts of the instrument, and the expansible unit replaced by another, by any individual capable of doing elementary mechanical work. The use of experts and awaiting their arrival, convenience or access to the compass also becomes unnecessary, and while much time can be saved over the old method, the convenience of making the repairs quickly is of considerable importance and practical value, especially in an emergency at sea. The device has an accessible compression chamber for the convenient manipulation by the user for any purpose.

In the drawings which illustrate an embodiment of this invention.

Similar reference characters refer to similar parts throughout the drawings.

Figure 1:
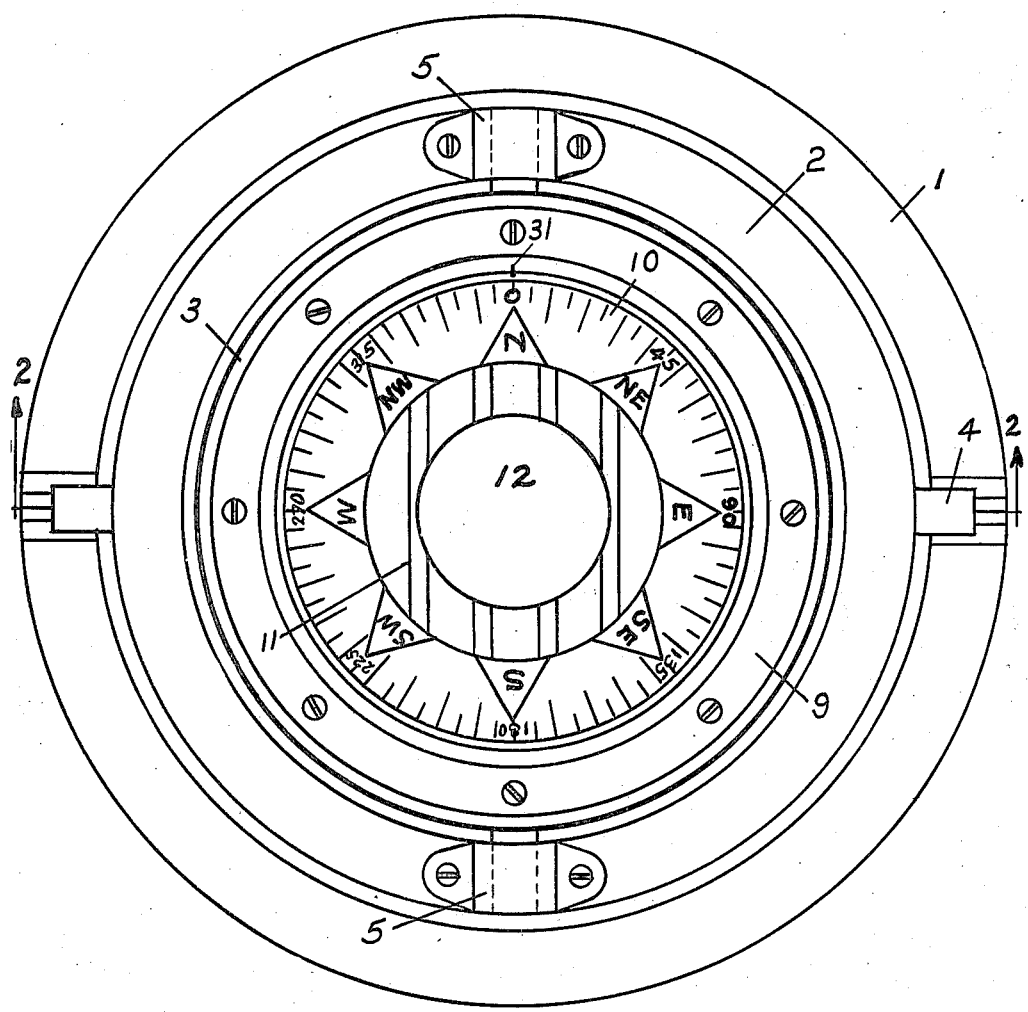
Figure 1 is a plan view of a compass unit embodying this invention.
Figure 2:
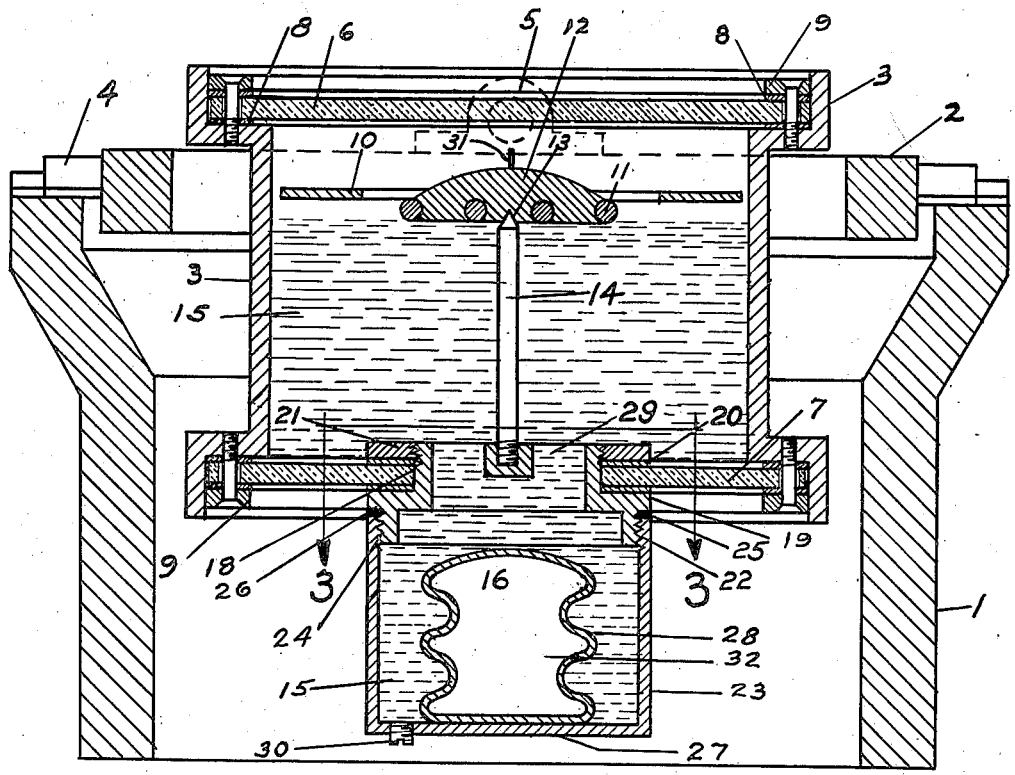
Figure 2 is a sectional elevation of Figure 1 taken along line 2—2.
Figure 3:
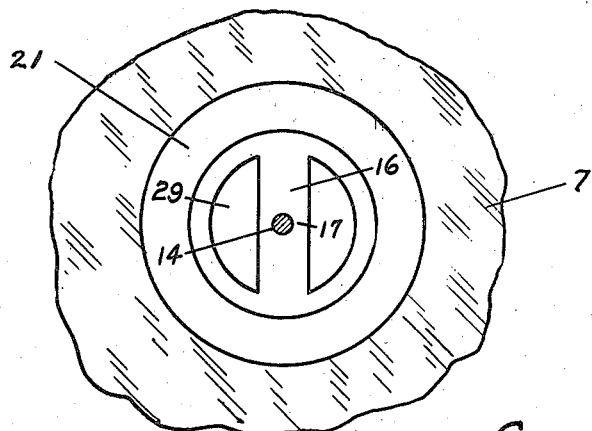
Figure 3 is a sectional plan view taken along line 3—3 of Figure 2.
Figure 4:
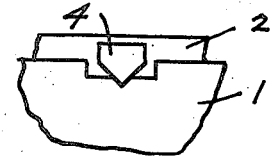
Figure 4 is a detail showing one of the gimbals resting in its socket on the support.

The drawings indicate a conventional support 1 upon which is placed a ring 2 for supporting a compass casing 3. The ring is pivoted on the support by gimbals 4 and swings in an arcuate manner thereon. The compass is suspended in the ring by bearings 5. The latter is of general conventional form, with glass cover 6 and glass bottom 7 adapted for internal illuminating purposes. The glass cover 6 and bottom 7 are inserted in the compass casing between flexible washers 8 and held in place in a weatherproof manner by ring nuts 9 which are screwed into the casing. A skeleton card 10 mounted on parallel magnets 11 are attached to a center portion 12 and is suspended on a pin point 13 of pivot 14 and floats in the medium 15.

The pivot 14 is supported by a spider frame 16 at its central portion 17. The card unit floats in the medium and assumes normally a horizontal position therein, with slight variations as the ship tips and tosses. This structure is attached directly to the casing as indicated. The bottom plate 7 is securely fastened in position in the casing 3 as described, with its central portion formed with an opening 18 designed to receive a shell member 19 which projects therethrough. The shell member is provided with two flexible washers 20 which are locked in position by nut 21 to make it leak proof. The lower portion of the shell member 19 is externally screw-threaded at 22 to receive a cup unit 23 provided with internal threads 24 at its open end adapted to engage with the screw-threads 22. The packing material 25 is used to increase its leak-proof qualities and to prevent the cup being screwed in too tightly against the metal or material at 26. The bottom 27 of the cup has a thin-walled corrugated element 28 within it and preferably attached thereto. The casing has the usual lubber's line 31 which is drawn vertically on the case which is then set to line up with the vessel's keel, so as to show the direction of her head.

The element is hollow internally so as to enable it to take up any expansion or contraction taking place in the liquid within the casing and cup and thus prevent any pressure tendency to cause the liquid to leak through the joints of the casing and throw the compass out of calibration and adjustment.

The cup unit is readily placed or removed. The shell member permits this and at the same time the other parts can remain untouched and undisturbed. Should the element 28 become leaky and the liquid medium passes into it, or should it be found necessary to replace the corrugated element, this can be done by removing the cup and inserting a new one without disturbing the compass proper.

The pivot 14 is also accessible through the slots 29 in the shell member 19 for any minor adjustments that it may need at the same time, while the cup is off. The operation of the compass in the device is similar to that of the conventional type, and will not be further described herein.

A filling plug 30 is also provided in the side wall of the device for filling or draining. The cup unit forms a compression chamber externally placed to the main casing of the instrument and preferably adjacent to the pivot 14 and shell member 19 and spider 16 which supports the card mechanism.

While but one general form of the invention is shown in the drawings and described in the specifications, it is not desired to limit this application to this particular form or in any other way otherwise than limited by the scope thereof, as it is appreciated that other forms could be made that would use the same principles and come within the scope of the appended claims.

Having thus described the invention, what is claimed is:

1. A compass of the class described comprising an external casing, a transparent cover mounted on the upper surface of the casing, a transparent bottom attached to the lower portion of the casing and provided with an opening therein, a spider frame with openings therethrough mounted on the said bottom having a shell element connected therethrough and encompassed by the edges of said opening so as to fit closely thereto, a cup unit attachable to the said shell element and of restricted cross section disposed under the said bottom so as to be readily removable therefrom to permit access to the interior of the casing through the openings in said spider frame, a liquid medium in the casing and cup, a expansible and contractible bellows mounted in the said cup unit and extending vertically in same from the bottom thereof to a line approximately aligned with the lower edge of the said shell element and presenting a rounded surface facing upwardly, a pivot rigidly attached to the spider frame and vertically positioned above same, a solid float with its upper surface convexed adapted to float in the medium and disposed on the point of said pivot adapted to adjust itself on same in various directions, magnets arranged parallel on the bottom of the float and coordinated with the magnetic influence of the earth, a compass card and needle mounted on the float above the magnets so as to float above the said medium with indices marked thereon to indicate magnetic positions of the needle.

2. A compass of the class described comprising an external casing, a transparent cover mounted on the upper surface of the casing, a bottom attached to the lower portion of the casing, and provided with a opening therein, a spider frame with openings therethrough mounted on the said bottom and encompassed by the edges of said opening so as to fit closely thereto, a cup unit attachable to the said shell element disposed under the said bottom so as to be readily removable therefrom to permit access to the interior of the casing through the said spider frame, a liquid medium in the casing and cup, a pivot attached to the spider frame and positioned above same, a solid float adapted to float in the medium and disposed on the point of said pivot adapted to adjust itself on same, magnets arranged parallel on the bottom of the float and coordinated with the magnetic influence of the earth, a compass card and needle mounted on the float and above the magnets with indices marked thereon to indicate magnetic positions of the needle, and means for carrying the casing and permitting it to position itself in a horizontal plane regardless of the vertical or horizontal plane of the said means.

CLARENCE E. KEEFER.